United States Patent
Chang et al.

(10) Patent No.: US 8,279,876 B2
(45) Date of Patent: Oct. 2, 2012

(54) DATA SERVICE APPARATUS AND METHOD IN HETEROGENEOUS WIRELESS NETWORKS

(75) Inventors: Young-Bin Chang, Anyang-si (KR); Eun-Taek Lim, Suwon-si (KR); Jung-Min Ro, Seoul (KR); Jae-Hyuk Jang, Deagu (KR); Dong-Seek Park, Yongin-si (KR); Young-Kwon Cho, Suwon-si (KR); Joon-Young Choi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1327 days.

(21) Appl. No.: 11/581,308

(22) Filed: Oct. 16, 2006

(65) Prior Publication Data

US 2007/0116012 A1    May 24, 2007

(30) Foreign Application Priority Data

Oct. 14, 2005   (KR) .................. 10-2005-0096859

(51) Int. Cl.
*H04B 7/204*    (2006.01)
*H04J 3/00*    (2006.01)
*H04J 3/16*    (2006.01)
*H04J 3/22*    (2006.01)
*H04L 12/66*    (2006.01)
*H04L 12/28*    (2006.01)
*H04L 12/56*    (2006.01)
*H04W 4/00*    (2009.01)

(52) U.S. Cl. ................... 370/395.52; 370/325; 370/345; 370/352; 370/466; 455/466

(58) Field of Classification Search .................. 370/325, 370/345, 352, 395.52, 466; 455/466
See application file for complete search history.

(56) References Cited

U.S. PATENT DOCUMENTS 6,594,278 B1 *   7/2003   Baroudi ........................ 370/466
(Continued)

FOREIGN PATENT DOCUMENTS

KR     1020040089067          10/2004
(Continued)

OTHER PUBLICATIONS

Sik Choi et al: "Fast Handover Scheme for Real-Time Downlink Services in IEEE 802.16e BWA System", vol. 3, May 30, 2005.

(Continued)

*Primary Examiner* — Hassan Phillips
*Assistant Examiner* — Lonnie Sweet
(74) *Attorney, Agent, or Firm* — The Farrell Law Firm, P.C.

(57) ABSTRACT

Provided are an apparatus and a method for providing a concurrent data service to an Mobile Station (MS) through a plurality of heterogeneous networks. In a method for providing a data service to an MS through different wireless networks, the MS measures channel qualities of at least one accessible wireless network and reports the measured channel qualities to an Internet Protocol (IP) packet controller. The IP packet controller selects wireless networks for data transmission on the basis of the reported channel qualities, distributes data destined for the MS, and transmits the distributed data to the selected wireless networks. The selected wireless networks receive the data from the IP packet controller and transmits the received data to the MS. The MS combines and interprets the data received from the selected wireless networks. Accordingly, it is possible to provide a seamless data service to the MS in service environments with a mixture of different wireless communication systems.

12 Claims, 9 Drawing Sheets

U.S. PATENT DOCUMENTS

| | | | |
|---|---|---|---|
| 2002/0102987 A1* | 8/2002 | Souisse et al. | 455/454 |
| 2003/0081582 A1 | 5/2003 | Jain et al. | |
| 2003/0202505 A1* | 10/2003 | Ozugur | 370/352 |
| 2004/0208144 A1* | 10/2004 | Vinayakray-Jani | 370/331 |
| 2005/0068916 A1* | 3/2005 | Jacobsen et al. | 370/328 |
| 2005/0173509 A1* | 8/2005 | Miettinen | 235/375 |
| 2006/0140147 A1* | 6/2006 | Van Bemmel | 370/329 |
| 2006/0194600 A1* | 8/2006 | Palin et al. | 455/512 |
| 2007/0076649 A1* | 4/2007 | Lin et al. | 370/328 |

FOREIGN PATENT DOCUMENTS

| | | |
|---|---|---|
| KR | 1020040093653 | 11/2004 |
| WO | WO 01/50706 | 7/2001 |
| WO | WO 02/23745 | 3/2002 |
| WO | WO 2004/008698 | 1/2004 |

OTHER PUBLICATIONS

Howon Lee. et al: "An Efficient Uplink Scheduling Algorithm for VoIP Services in IEEE 802.16 BWA Systems", vol. 5, Sep. 26, 2004.

* cited by examiner

DATA SERVICE APPARATUS AND METHOD IN HETEROGENEOUS WIRELESS NETWORKS

PRIORITY

This application claims priority under 35 U.S.C. §119 to an application filed in the Korean Intellectual Property Office on Oct. 14, 2005 and assigned Serial No. 2005-96859, the contents of which are incorporated herein by reference.

BACKGROUND OF THE INVENTION

1. Field of the Invention

The present invention relates generally to an apparatus and method for preventing frequent handoffs in radio environments with a mixture of a plurality of heterogeneous wireless networks, and in particular, to an apparatus and method for providing a data service to a Mobile Station (MS) concurrently through a plurality of heterogeneous networks.

2. Description of the Related Art

Commercialization of a fourth-generation (4G) communication system is expected around 2010. Research ongoing to provide a stationary data service with a data rate of 1 Gbps and a mobile data service with a data rate of at least 100 Mbps in the 4G communication system. Evolved 2G/3G technologies or many new technologies are provided as technology candidates for the 4G communication system. These technologies provide voice call services as well as high-rate data services that are based on different service concepts. However, presently, there is no breakthrough technology that can be fully qualified as 4G technologies. According to the existing papers and documents, the 4G technology candidates can be classified into the following three groups.

The first group includes Wideband Code Division Multiple Access (WCDMA) and High-Speed Downlink Packet Access (HSDPA) that have been provided by a third Generation Partnership Project (3GPP), and also includes Code Division Multiple Access 2000 (CDMA2000), Evolution for Data Only (1×EVDO), and Evolution for Data and Voice (1×EVDV) that have been provided by a third Generation Partnership Project 2 (3GPP2). These technologies provide an average data rate of only several Mbps, but can support a seamless voice/data service whether under conditions of high-speed movement and can provide a communication service in almost all areas because of its large cell coverage.

The second group includes Wireless Metropolitan Area Network (WMAN) that will be provided as a metropolitan data service by American Institute of Electrical Electronics Engineers (IEEE) 802.16. The WMAN service is also called "802.16 service". The WMAN corresponds to Korean WiBro, standardized in 2005, and to Intel WiMAX. The WMAN is similar in concept to the existing cellular network, but can support an average data rate of up to several tens of Mbps. The WMAN supports a medium-speed mobility of up to 60 km/h and provides a cell coverage of up to 1 km.

The third group includes Wireless Local Area Network (WLAN) that American IEEE 802.11 developed to replace the existing wired Internet service. The WLAN was standardized in 1999, and has evolved through IEEE 802.11a/b to IEEE 802.11g. The WLAN is now in commercial use and is constantly evolving. Presently, the WLAN provides an average data rate of several tens of Mbps, but is expected to provide an average data rate of up to several hundreds of Mbps in the near future. The WLAN is expected to be the first of the 4G technology candidates that can implement a stationary data rate of 1 Gbps. However, the WLAN hardly supports the mobility and thus merely provides a local communication service with a cell coverage of up to 100 m.

Another candidate for the 4G technologies is an IEEE 802.15 service called "Wireless Personal Area Network (WPAN) service". The WPAN service has a much larger cell coverage than the WLAN service and supports a data service with a data rate of at least 1 Gbps. For example, the WPAN service is implemented using near-field high-speed communication technologies such as Ultra-Wideband (UWB) technology and Bluetooth® technology. Hereinafter, WLAN and WPAN will be collectively referred to as "WLAN".

FIG. 1 is a diagram illustrating a radio access environment with a mixture of a plurality of heterogeneous networks.

Referring to FIG. 1, a network 111 (shown as a circle with a solid line) with the largest cell coverage denotes the 2G/3G cellular network, a network 112 (shown as circle with broken lines) with the medium-sized cell coverage denotes the WMAN, and a network 113 (shown as a circle with dashed lines) with the smallest cell coverage denotes the WLAN. It is assumed that a Mobile Station (MS) 103 can receive all services of the above mentioned networks.

The MS 101 in a region 111 can connect and communicate with the cellular network. The MS 123 in a regions 111 and 112 can connect and communicate with the cellular network and the WMAN. The MS 103 in regions 111, 112, and 113 can connect and communicate with the cellular network, the WMAN, and the MLAN. The MS 103 in a given region performs a switching operation through one of a vertical handoff and radio reconfiguration to select only one of the networks that has the best performance in the given region.

However, when the MS 103 selects only one of the networks, the following problems occur.

Firstly, when the MS 103 moves at high speed, a handoff occurs too frequently. As a result, an exchange of control information between the different networks occurs too frequently, which may lead to an overhead against high-rate data communication.

Secondly, when the MS 103 connecting to one of the WLAN and the WMAN moves at a high speed that is unsupportable in the WMAN and the WLAN, an ongoing transmission/reception (TX/RX) operation is not smooth and thus an ongoing communication is broken. In this case, the MS 103 reconnects to the cellular network that can support the high-speed movement, which can lead to another overhead.

SUMMARY OF THE INVENTION

An object of the present invention is to substantially solve at least the above problems and/or disadvantages as well as to provide at least the advantages below. Accordingly, an object of the present invention is to provide an apparatus and method for providing a data service to an MS concurrently through a plurality of heterogeneous networks.

Another object of the present invention is to provide an apparatus and method for providing a seamless data service to an MS in wireless environments with a mixture of a plurality of heterogeneous wireless networks.

A further object of the present invention is to provide an apparatus and method for ensuring Quality of Service (QoS) for an MS in wireless environments with a mixture of a plurality of heterogeneous wireless networks.

Still another object of the present invention is to provide an apparatus and method for preventing frequent handoffs in wireless environments with a mixture of a plurality of heterogeneous wireless networks.

Yet another object of the present invention is to provide an apparatus and method for reducing a signaling overhead due to frequent handoffs in radio environments with a mixture of a plurality of heterogeneous wireless networks.

According to an aspect of the present invention, there is provided an apparatus for distributing packets to different wireless networks, including: an Internet Protocol (IP) layer for processing IP packets received from an IP network; and an IP sublayer for distributing IP packets received from the IP layer for transmission to at least one wireless network accessible by an MS and transferring each of the distributed IP packets to a MAC layer of the corresponding wireless network.

According to another aspect of the present invention, there is provided an apparatus for an MS, including: MAC layers for communicating with different wireless networks; and an IP sublayer for combining IP subpackets transferred from the MAC layers and received from the different wireless networks into an IP packet and transferring the resulting IP packet to an IP layer.

According to a further aspect of the present invention, there is provided a method for providing a data service from an IP packet controller to an MS, including determining at least one accessible wireless network accessible by the MS; distributing IP packets destined for the MS for transmission to the accessible wireless networks; and transmitting each of the distributed IP packets to the corresponding wireless network.

According to still another aspect of the present invention, there is provided a communication method for an MS, including measuring channel qualities between the MS and at least one accessible wireless network and reporting the measured channel qualities to an upper-layer network device; receiving IP subpackets from the accessible wireless networks under the control of the upper-layer network device; and combining the received IP subpackets into an IP packet and determining the corresponding application data.

According to yet another aspect of the present invention, there is provided a method for providing a data service to an MS through different wireless networks, including, measuring channel qualities of at least one more accessible wireless networks and reporting the measured channel qualities from the MS to an IP packet controller; selecting wireless networks for data transmission on the basis of the reported channel qualities, distributing data destined for the MS, and transmitting the distributed data from the IP packet controller to the selected wireless networks; receiving the data from the IP packet controller and transmitting the received data from the selected wireless networks to the MS; and combining and interpreting, at the MS, the data received from the selected wireless networks.

According to still yet another aspect of the present invention, there is provided a method for providing a data service to an MS through different wireless networks, including reporting channel qualities of at least one accessible wireless network and the amount of TX data from the MS to an IP packet controller; transmitting an uplink scheduling control message from the IP packet controller to the accessible wireless networks on the basis of the reported channel qualities and data amount; transmitting channel allocation messages from the accessible wireless networks to the MS on the basis of the uplink scheduling control message; and distributing the TX data into packets on the basis of the channel allocation messages and transmitting each of the packets from the MS to the corresponding accessible wireless network.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail. Also, the terms used herein are defined according to the functions of the present invention. Thus, the terms may vary depending on user's or operator's intension and usage. That is, the terms used herein must be understood based on the descriptions made herein.

The present invention provides a scheme for providing a data service to a Mobile Station (MS) concurrently through heterogeneous networks in the 4G wireless (radio) environments with a mixture of cellular network (e.g., WCDMA, EV-DO, and EV-DV)-based communication systems, WMAN-based communication systems, and WLAN-based communications systems that are leading candidates for communication technology. Hereinafter, the above data service will be referred as "concurrent data service". The use of the concurrent data service makes it possible to prevent a vertical handoff that can occur in wireless environments with a mixture of heterogeneous networks.

Figure 1:
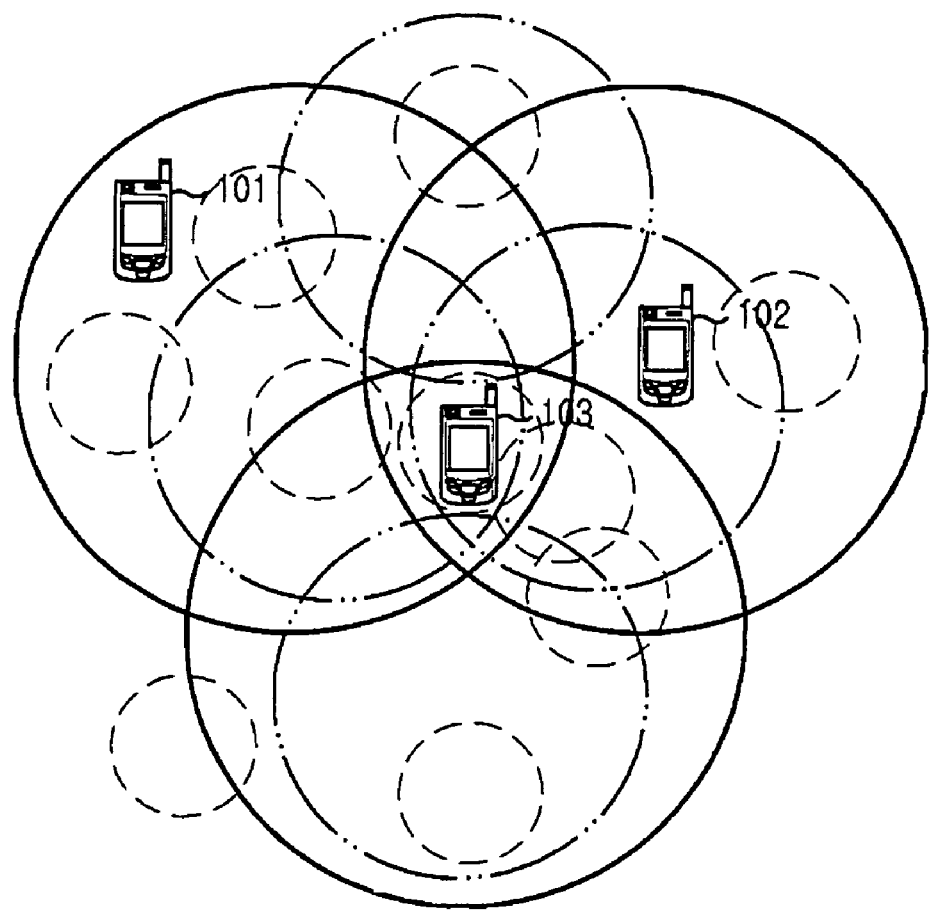
FIG. 1 is a diagram illustrating a radio access environment with a mixture of a plurality of heterogeneous networks.
Figure 1:
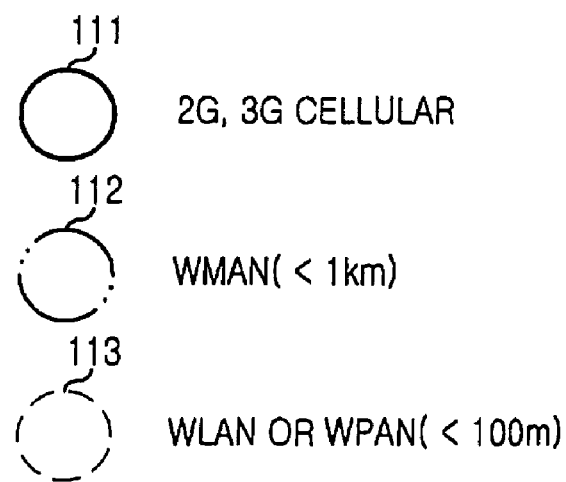
Figure 2:
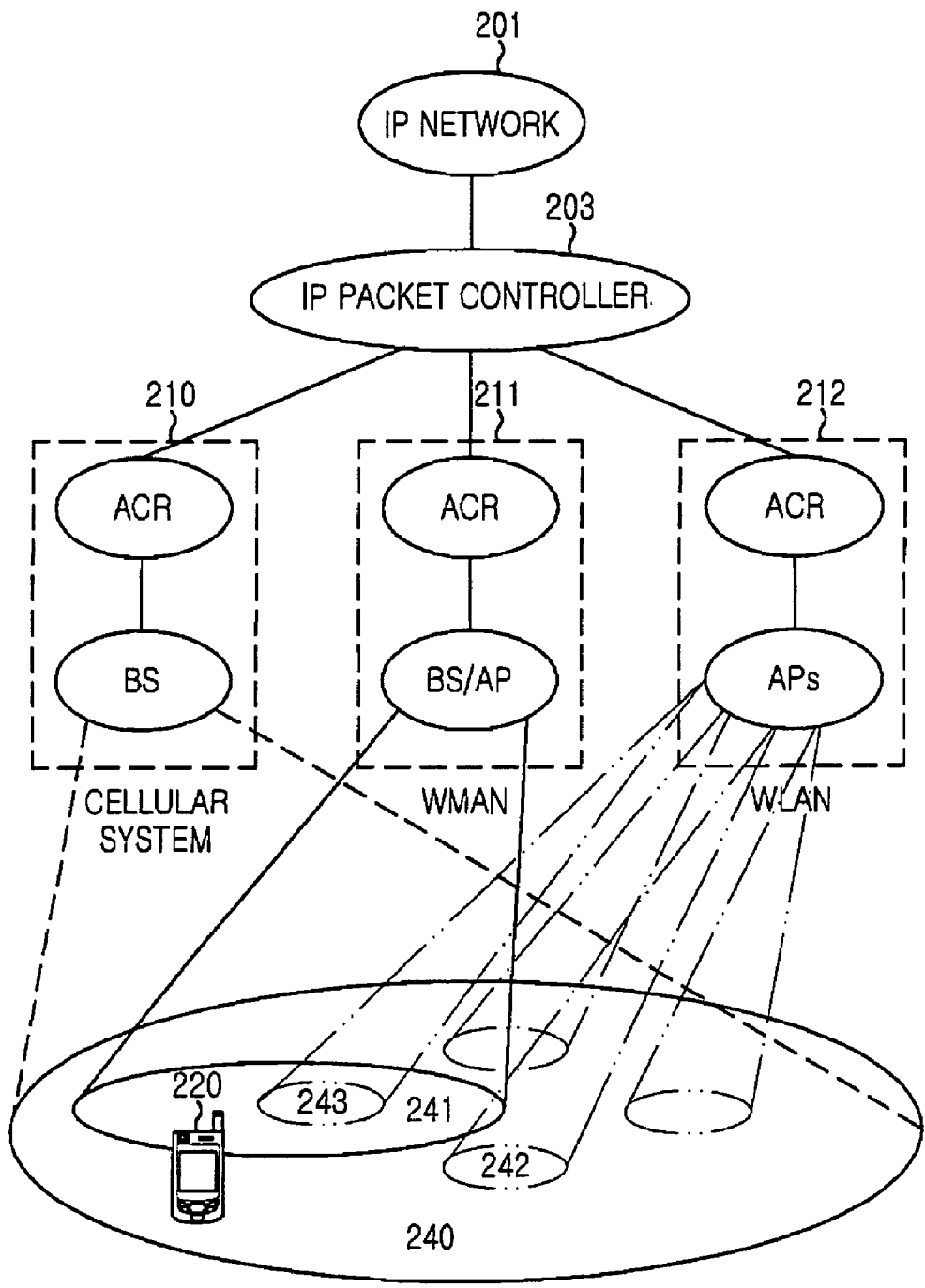
FIG. 2 is a schematic block diagram illustrating the architecture of a communication network according to the present invention.

FIG. 2 is a schematic block diagram illustrating the architecture of a communication network according to the present invention. Referring to FIG. 2, the communication network includes an IP network 201, an IP packet controller 203, and a plurality of heterogeneous wireless networks. Examples of the heterogeneous wireless networks are a cellular network 210, a WMAN 211, and a WLAN 212. The IP network 201 performs an IP packet communication. The IP packet controller 203 receives IP packets from the IP network and distributes the received IP packets to the heterogeneous wireless networks. Each of the heterogeneous wireless networks receives data from the IP packet controller 203 and transmits the received data to an MS 220. Each of the heterogeneous wireless networks includes an Access Control Router (ACR) that is a node connected to the IP network in a wired fashion; and one of a Base Station (BS) and an Access Point (AP) that is a node connected to the MS 220 in a wireless fashion.

The cellular network 210 has the largest cell coverage, can provide a data service throughout the entire area, and can provide a voice call service as well as a wireless data service with a data rate of 0.1 Mbps to 5 Mbps under mobile environments with high mobile speeds of up to 300 km/h. Examples of the cellular network 210 are the Code Division Multiple Access (CDMA) network, the Global System for Mobile Communications (GSM) network, the Evolution Data and Voice (EV-DV) network, the Evolution Data Only (EV-DO) network, the WCDMA network, and the HSDPA network. The WMAN 211 has a cell coverage or equal to at most that of the cellular network 210, which can provide a data service in a metropolitan area, and can provide an IP voice call service as well as a wireless data service with a data rate of 1 Mbps to 50 Mbps under mobile environments with medium mobile speeds of up to 80 km/h. Examples of the WMAN 211 are the WiBro network, the 802.16 network, and the WiMAX network. The WLAN 212 has the smallest cell coverage, which can hardly provide a data service in mobile environments, and can provide a wireless data service with a data rate of about 10 Mbps to 1 Gbps. Examples of the WLAN 212 are the existing WLAN and the modified WLAN.

The IP packet controller 203 is connected between the IP network 201 and each of the heterogeneous wireless networks. Although the actual network architecture is more complex, only communication nodes are defined to represent the location of the IP packet controller 203, for conciseness.

The MS 220 can connect to all the heterogeneous wireless networks. When the MS 220 moves at a given speed under mobile environments with a mixture of the heterogeneous wireless networks 210, 211 and 212, it periodically measures the qualities of preamble or pilot signals that are broadcast from the heterogeneous wireless networks 210, 211 and 212 and reports the measured signal qualities to the IP packet controller 203 through one of the BS and the AP. The IP packet controller 203 analyzes the reported signal qualities and transmits IP packets to the MS 220 through at least one of the heterogeneous wireless networks that is determined to be able to perform a data communication.

When the MS 220 is located in a first region 240 and thus can communicate only with the cellular network 210, the IP packet controller 203 transmits all data received from the IP network 201 to the MS 220 through the cellular network 210. In this case, a user of the MS 220 can receive only one of a low-rate and medium-rate seamless data service although the user wants to receive a high-rate data service.

When the MS 220 is located in a second region 241, if can communicate with the cellular network 210 as well as with the WMAN 211. In this case, the conventional system breaks a communication with the cellular network 210 and performs a vertical handoff for a communication with the WMAN 211. Alternatively, instead of performing a vertical handoff, the present system transmits data from the IP packet controller 230 to the MS 220 concurrently through the cellular network 210 and the WMAN network 211. Therefore, the user of the MS 220 can receive a voice call service (i.e., a VoIP service) through the cellular network 210 as well as a moving picture service through the WMAN 211.

When the MS 220 is located in a third region 242, the IP packet controller 203 can transmit data to the MS 220 through the cellular network 210 and the WLAN 212. When the MS 220 is located in a fourth region 243, it can receive data through the cellular network 210, the WMAN 211 and the WLAN 212. When the MS 220 receiving a high-rate data service in the fourth region 243 moves into the first region 240, it cannot continue to receive the high-rate data service but can receive a low-rate or medium-rate data service seamlessly.

Because the MS 220 can receive data concurrently through the heterogeneous wireless networks, the present invention can provide a seamless data service even in mobile environments and can prevent a vertical handoff.

The above description of DownLink (DL) data transmission can be similarly applied to UpLink (UL) data transmission. In detail, each of the wireless networks schedules a UL TX operation of the MS 220 and informs the MS 220 of the scheduling results. Based on control information received from the heterogeneous wireless networks, the MS 220 uses corresponding interface modules (or wireless access modules) to transmit DL data to the IP packet controller 203 through the wireless networks. Upon receipt of the data through the wireless networks, the IP packet controller 203 combines and transmits the received data to the IP network 201.

As described above, the present invention makes it possible to effectively provide a seamless data service to the MS in complex heterogeneous-network environments of a metropolitan area by concurrently using heterogeneous wireless resources without performing a vertical handoff. In addition, the IP packet controller 203 can effectively distribute and transmit UL data by allocating a plurality of heterogeneous resources to the MS.

Figure 3:
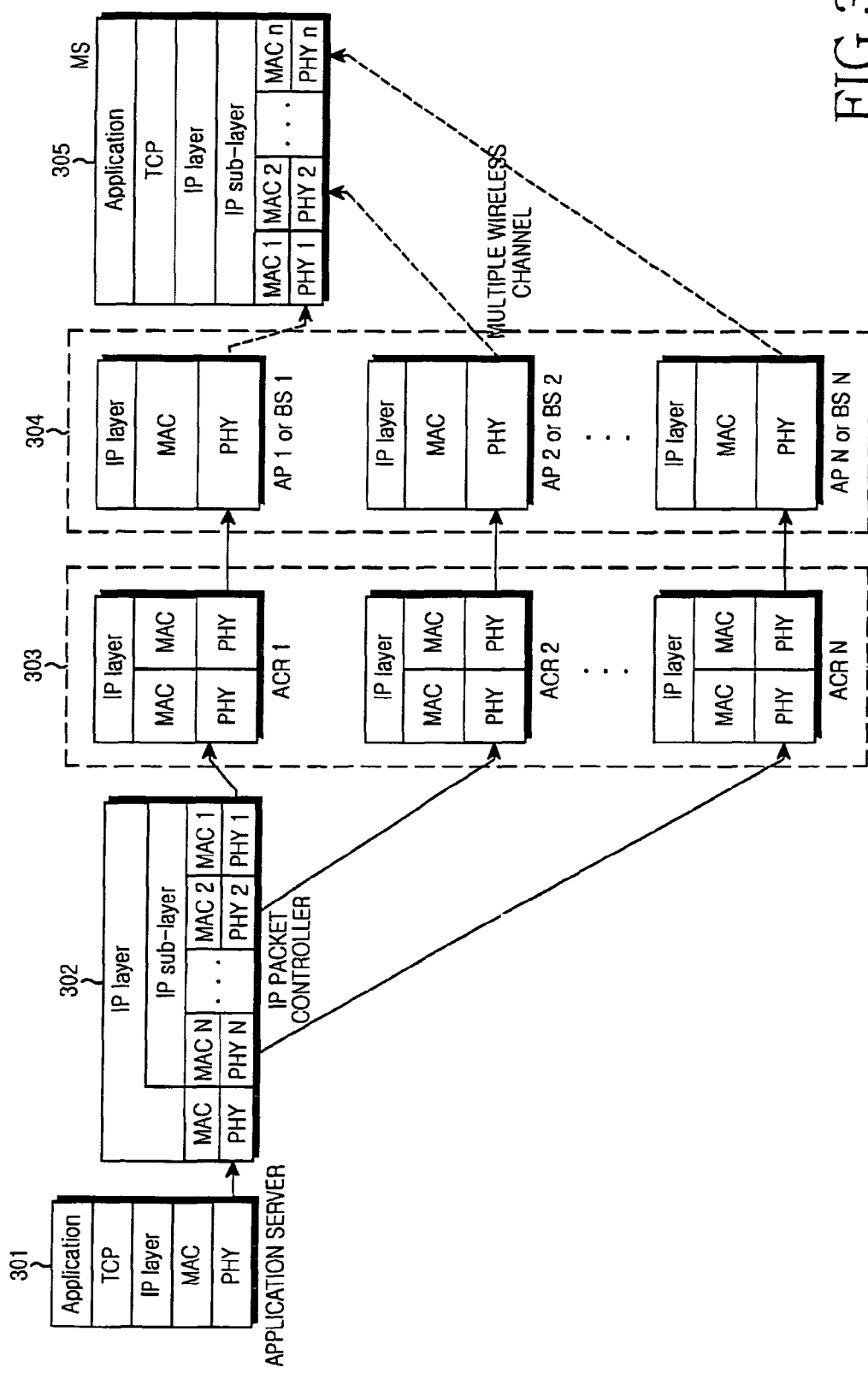
FIG. 3 is a diagram illustrating a protocol stack for providing a concurrent data service according to the present invention.

FIG. 3 is a diagram illustrating a protocol stack for providing a concurrent data service according to the present invention.

Referring to FIG. 3, an application server (i.e., termination equipment) 301 includes a PHYsical layer (PHY), a Media Access Control (MAC) layer, an Internet Protocol (IP) layer, a Transmission Control Protocol (TCP) layer, and an Application layer. An IP packet controller 302 includes a PHY, a MAC layer, an IP sublayer, and an IP layer. The IP packet controller 302 includes a plurality of MAC layer/PHY layer pairs for communication with a plurality of different wireless networks. An ACR 303 of each wireless network includes a PHY layer, a MAC layer, and an IP layer. A BS (or AP) 304 of each wireless network includes a PHY layer, a MAC layer, and an IP layer. An MS 305 is a termination device that supports a multiple wireless network. The MS 305 includes a PHY layer, a MAC layer, an IP sublayer, an IP layer, a TCP layer, and an Application layer. Actual data exchange occurs between the MS 305 and the application server 301 connected to an IP network by End-To-End (E2E).

For DL data transmission, service data generated at the Application layer of the application server 301 are sequentially transferred through respective protocol layers to respective Applications layers. At this point, each protocol layer adds a header to data received from an upper layer. For example, the IP layer adds an IP header containing MS IP address information to the received data. The PHY layer processes data received from the MAC layer into transmissible data and transmits the resulting data to the IP packet controller 302.

The physical layer of the IP packet controller 302 receives data from the application server 301, and the received data are sequentially transferred through respective protocol layers to respective IP layers. The IP layer interprets an IP packet received from a MAC layer to determine which terminal the data is destined for, and transfers the data to a corresponding IP sublayer.

According to the present invention, the IP sublayer determines the amount of TX data and which wireless network the TX data is to be transmitted through, and divides an IP packet. At this point, the IP packets are divided on the basis of the possibility of communication between an MS and a wireless network and the periodic information about each wireless channel. An IP sublayer header ("subheader") containing sequence information is added to the divided data so that a receiving side can restore original data. An original IP header is added to the subheader to generate IP subpackets. Each of the IP subpackets is transmitted to an MAC layer and a PHY layer that communicate with a corresponding wireless network. The physical layer processes data received from the upper MAC layer into transmissible data and transmits the resulting data to the ACR of the corresponding wireless network.

The ACR 303 transmits data received from the IP packet controller 302 to a BS (or an AP) communicating with the MS 305, and the BA (or the AP) 304 transmits data received from the ACR 303 to the MS 305 over a wireless channel.

In order to receive data concurrently from a plurality of wireless networks, the MS 305 includes interface modules (PHY+MAC). Each interface module receives data from a corresponding wireless network and transmits the received data to an IP sublayer.

Based on the sequence information contained in a header, the IP sublayer combines packets received from a plurality of the interface modules on an IP packet basis and transmits the resulting data to an IP layer. The IP packet generated at the IP sublayer is transferred through each protocol layer to an application layer. The application layer interprets received data to provide a corresponding service to a user.

A UL data transmission is performed in the reverse order of the DL data transmission. In order to use a plurality of wireless networks, the MS 305 divides a TX IP packet into a plurality of packets and transmits each packet to the IP packet controller 302 through a corresponding wireless network. The IP packet controller 302 receives packets from the MS 305 through a plurality of wireless networks, combines the received packets on an IP packet basis, and transmits the combined packet to the application server 301. One IP packet is divided into a plurality of packets and the resulting packets are transmitted through a plurality of wireless networks. Alternatively, TX IP packets are multiplexed and transmitted through a plurality of wireless networks.

In a further embodiment, when a user receives a plurality of services, packets are classified according to the service types and are transmitted through a plurality of heterogeneous networks. For example, when a user receives a voice call service and a file download service simultaneously, voice packets are transmitted through a first wireless network that supports real-time characteristics while packets related to the file download are transmitted through a second wireless network that supports a high-rate data service but does not support the real-time characteristics.

Whereas, when all wireless networks have poor channel conditions, data are transmitted using a macro diversity scheme. That is, the same IP packet is repeatedly transmitted concurrently through a plurality of wireless networks, thereby providing a diversity gain in an MS.

Whereas, when all of the above schemes are used an IP packet can be transmitted through one of the division scheme, the multiplex scheme, and the repetition scheme, which is adaptively selected depending on given conditions.

Figure 4:
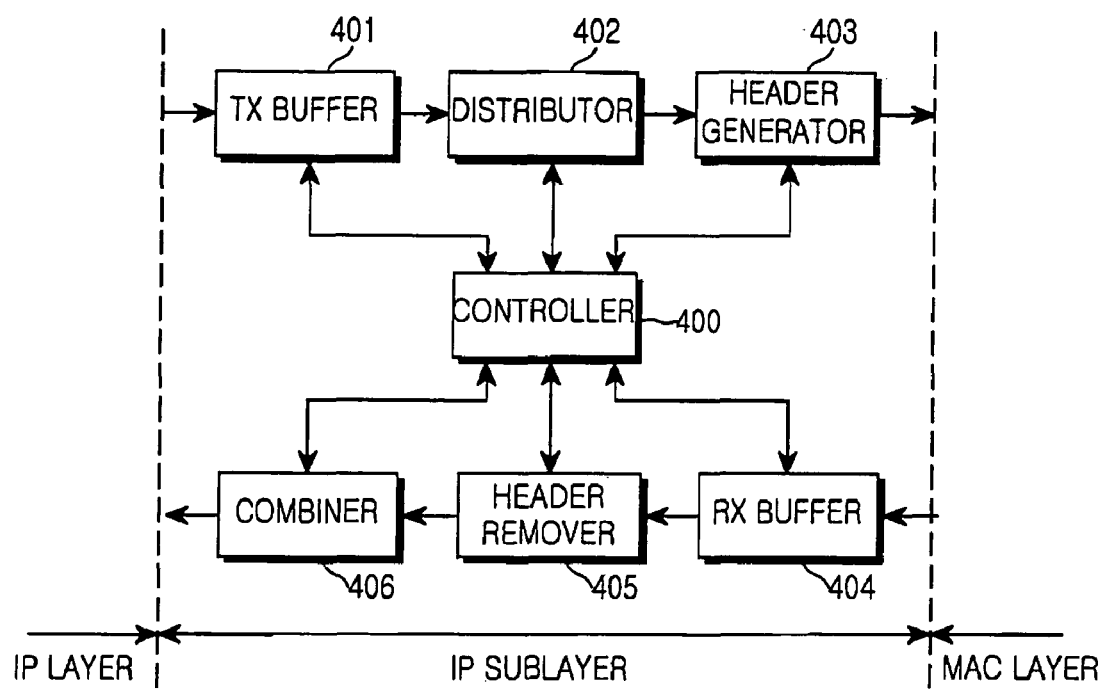
FIG. 4 is a function block diagram of an IP sublayer for an IP packet controller and an MS according to the present invention.

FIG. 4 is a function block diagram of an IP sublayer for an IP packet controller and an MS according to the present invention. Referring to FIG. 4, the IP sublayer includes a controller 400, a TX buffer 401, a distributor 402, a header generator 403, an RX buffer 404, a header remover 405, and a combiner 406.

The TX buffer 401 buffers and outputs IP packets received from an IP layer. In consideration of the wireless channel conditions between an MS and each wireless network, the controller 400 determines the intended division size and number of an IP packet. Under the control of the controller 400, the distributor 402 divides an IP packet received from the TX buffer 401 into a plurality of subpackets. Under the control of the controller 400, the header generator 403 adds a subheader containing a sequence number to each subpacket received from the distributor 402, adds an IP header to the subheader, and transfers the resulting data to a MAC layer. Hereinafter, each packet generated at the header generator 403 will be referred to as "IP subpacket".

Figure 5:
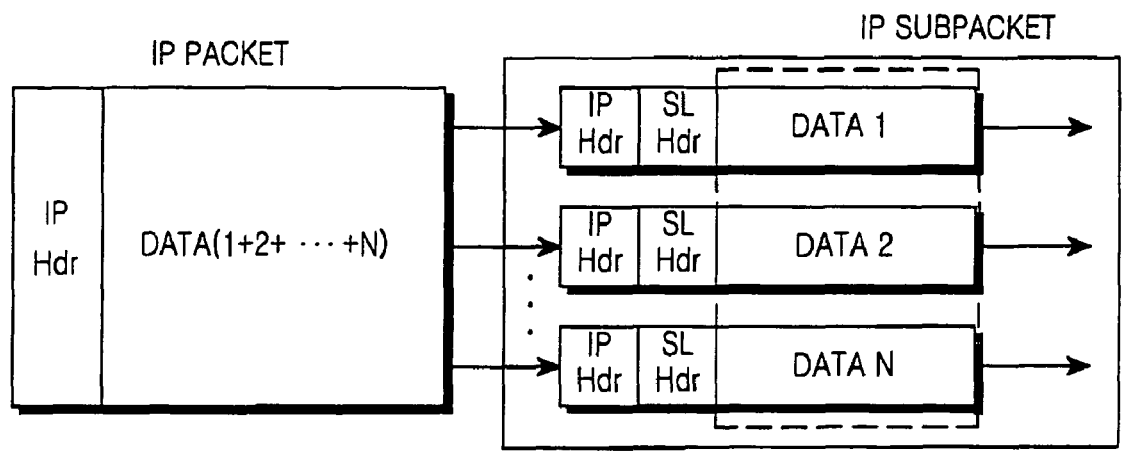
FIG. 5 is a diagram illustrating a scheme for dividing an IP packet into a plurality of subpackets according to the present invention.

FIG. 5 is a diagram illustrating a scheme for dividing an IP packet into a plurality of subpackets according to the present invention. Although the sizes of subpackets are illustrated as being identical to one another, they can be identical to or different from one another depending on the conditions of each wireless network, such as channel conditions and system performances.

Referring to FIG. 5, the RX buffer 404 buffers and outputs IP subpackets received from the MAC layer. The header remover 405 removes IP headers and subheaders from IP subpackets received from the RX buffer 404, outputs the removed IP headers to the combiner 406, and outputs packets sequentially according to the sequence numbers contained in the subheaders. The combiner 406 sequentially combines the packets received from the header remover 405 into one data unit, adds the IP header to the data unit, and transfers the resulting IP packet to the IP layer.

Figure 6:
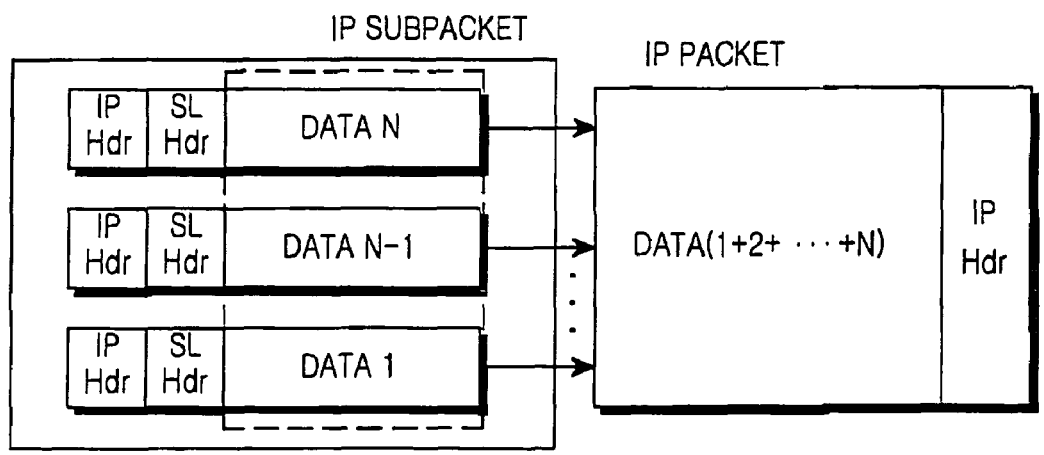
FIG. 6 is a diagram illustrating a scheme for combining a plurality of subpackets into an IP packet according to the present invention.

FIG. 6 is a diagram illustrating a scheme for combining a plurality of subpackets into an IP packet according to the present invention.

Referring to FIG. 6, Data DATA 1~DATA N corresponding to a payload of an IP packet are combined into one data unit according to the sequence numbers recorded in an subheader. Thereafter, an IP header IP Hdr is added to the data unit to generate an IP packet.

Figure 7:
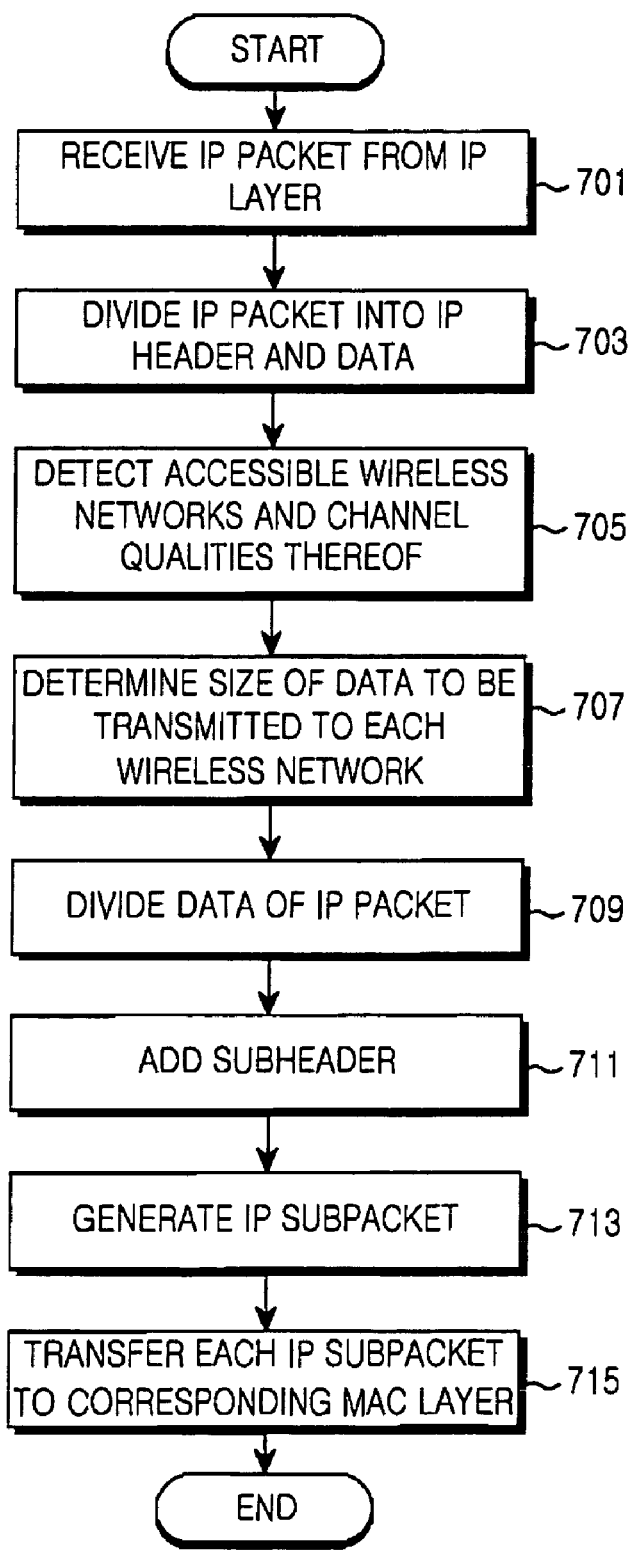
FIG. 7 is a flowchart illustrating a procedure for dividing, at an IP sublayer, an IP packet into a plurality of subpackets according to the present invention.

FIG. 7 is a flowchart illustrating a procedure for dividing, at an IP sublayer, an IP packet into a plurality of subpackets according to the present invention. For conciseness, the IP packet division will be described in terms of an IP packet controller and IP packet combination will be described in terms of an MS.

Referring to FIG. 7, in step 701 an IP sublayer receives an IP packet from an IP layer in step 701. In step 703, the IP sublayer divides the received IP packet into an IP header and data (or payload). In step 705, the IP sublayer determines accessible wireless networks of an MS, which is destined to receive an IP packet, and channel qualities of the accessible wireless networks. For example, the channel qualities can be determined using a Signal-to-Noise Ratio (SNR) and a Carrier-to-Interference and Noise Ratio (CINR) that are reported from the MS.

In step 707, the IP sublayer determines the size of data destined for each wireless network, on the basis of the detected channel qualities. Alternatively, the data size can be determined using a variety of parameters such as the performance (e.g., throughput) of each wireless network.

In step 709, the IP sublayer divides data of the IP packet suitably for transmission to each wireless network. In step 711, the IP sublayer adds a subheader containing a sequence number to each of the divided data. In step 713, the IP sublayer adds the IP header to each data containing the subheader to generate IP subpackets.

In step 715, the IP sublayer transfers each IP subpacket to a MAC layer corresponding to each wireless network.

Figure 8:
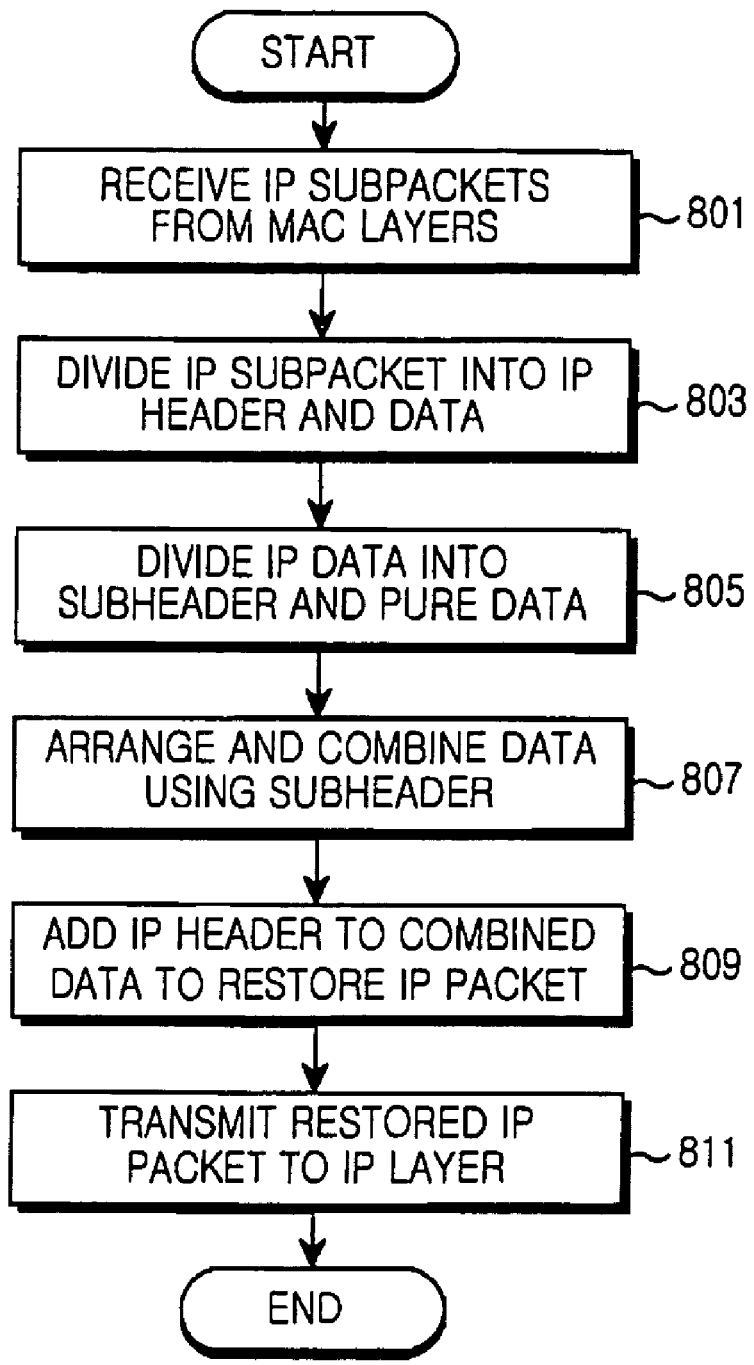
FIG. 8 is a flowchart illustrating a procedure for combining, at an IP sublayer, a plurality of subpackets into an IP packet according to the present invention.

FIG. 8 is a flowchart illustrating a procedure for combining, at an IP sublayer, a plurality of subpackets into an IP packet according to the present invention.

Referring to FIG. 8, in step 801 an IP sublayer receives IP subpackets concurrently from MAC layers through different wireless networks. In step 803, the IP sublayer divides the received IP subpacket into an IP header and data. In step 805, the IP sublayer divides the data into a subheader and pure data. In step 807, the IP sublayer arranges and combines the pure data according to the sequence numbers of the subheaders, thereby restoring a payload of an original IP packet. In step 809, the IP sublayer adds the IP header to the combined data to generate an original IP packet. In step 811, the IP sublayer transfers the restored IP packet to an IP layer. Hereinafter, an overall signaling procedure for the current data service according to the present invention will now be described in detail.

Figure 9:
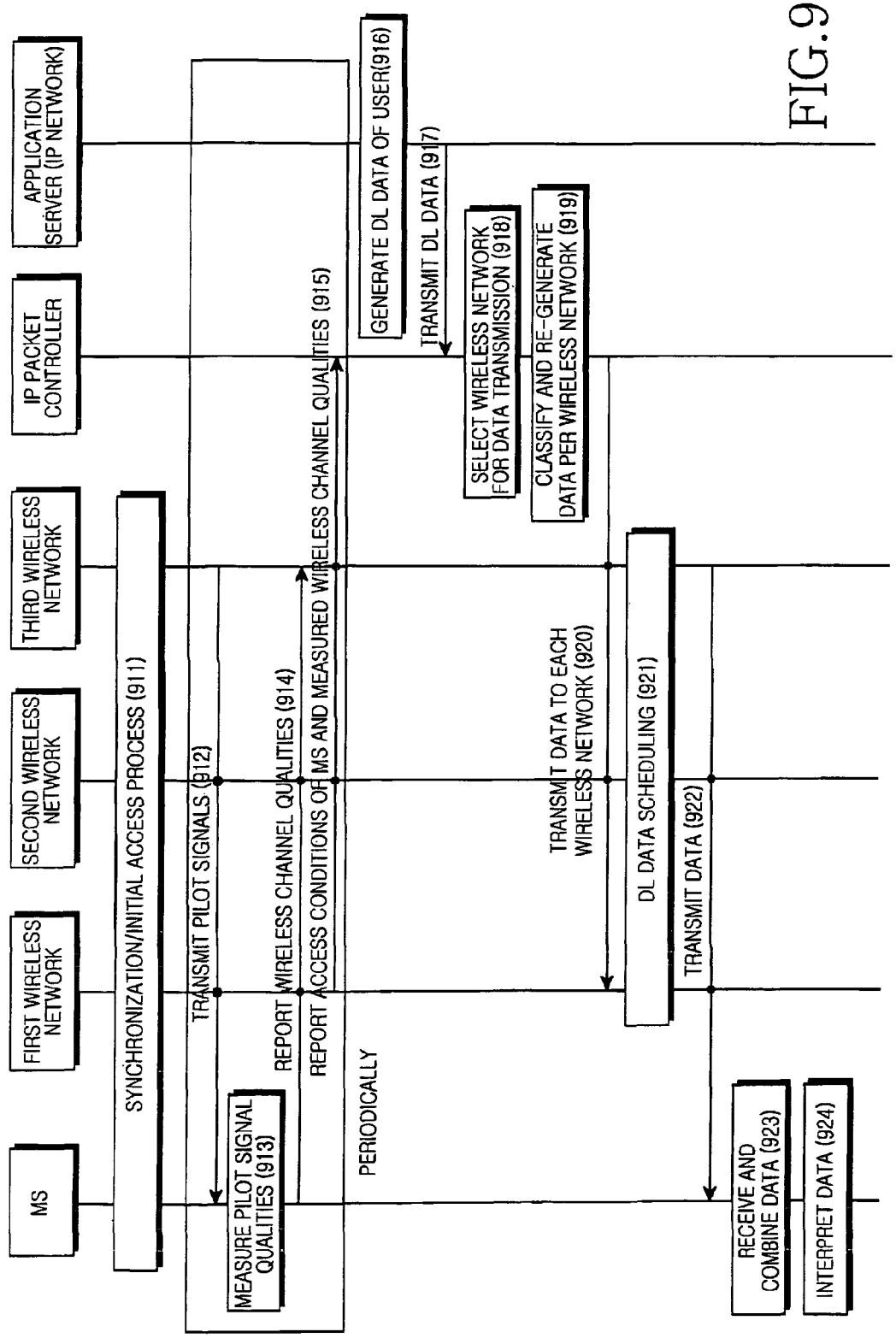
FIG. 9 is a flow diagram illustrating a DL data transmission procedure according to the present invention.

FIG. 9 is a flow diagram illustrating a DL data transmission procedure according to the present invention. For conciseness, wireless networks capable of communicating with an MS will be referred to as "first wireless network", "second wireless network", and "third wireless network".

Referring to FIG. 9, in step 911 an MS measures and determines the qualities of signals such as pilots or preambles that are received from a plurality of wireless networks (specifically, BSs or APs) to perform a DL/UL synchronization/initial access process with respect to accessible wireless networks. That is, the MS performs a DL/UL synchronization/initial access process with respect to a BS (or an AP) of the first wireless network, a BS (or an AP) of the second wireless network, and a BS (or an AP) of the third wireless network in the cell coverage of the first wireless network, the cell coverage of the second wireless network, and the cell coverage of the third wireless network, respectively. If the MS is located in a region where the first to the third wireless networks overlap one another, it performs an initial access process with respect to all of the first to the third wireless networks.

The DL synchronization process is performed using a preamble or pilot signal received from the BS, and the UL synchronization process is performed using a random access channel. Through the initial access process, the MS performs an authentication/authorization/accounting process for the BS and a preparation operation for data transmission.

In step 912, the MS receives pilot signals from the accessible wireless networks (the first to third wireless networks). In step 913, the MS measures the qualities of the received pilot signals. In step 914, the MS reports the measured wireless channel qualities to the corresponding wireless networks.

In step 915, the wireless networks report the access conditions of the MS and the wireless channel qualities to an IP packet controller. It is assumed that steps 912 to 915 are performed periodically.

In step 916, an application server generates DL data destined for the MS. The application server may be a website server that provides a variety of contents such as movie, music, and news. In step 917, the application server transmits the generated DL data to the IP packet controller through an IP network.

In step 918, the IP packet controller selects wireless networks that will receive the DL data, on the basis of the conditions of the MS, such as accessible wireless networks and channel qualities thereof, which are periodically reported. In step 919, the IP packet controller divides the DL data according to the reported channel qualities and the type and amount of the DL data to generate a packet destined for each wireless network. In step 920, the IP packet controller transmits the generated packet to each wireless network.

In step 921, the wireless networks perform a scheduling operation for other TX DL data and the packet received from the IP packet controller. In step 922, the wireless networks transmit the packet received from the IP packet controller to the MS according to the scheduling results. The scheduling results are also transmitted to the MS, and the MS receives the DL data according to the scheduling results.

In step 923, the MS combines the packets received from the first to the third wireless networks to restore an original packet. In step 924, the MS interprets the restored packet to determine the corresponding application data.

Figure 10:
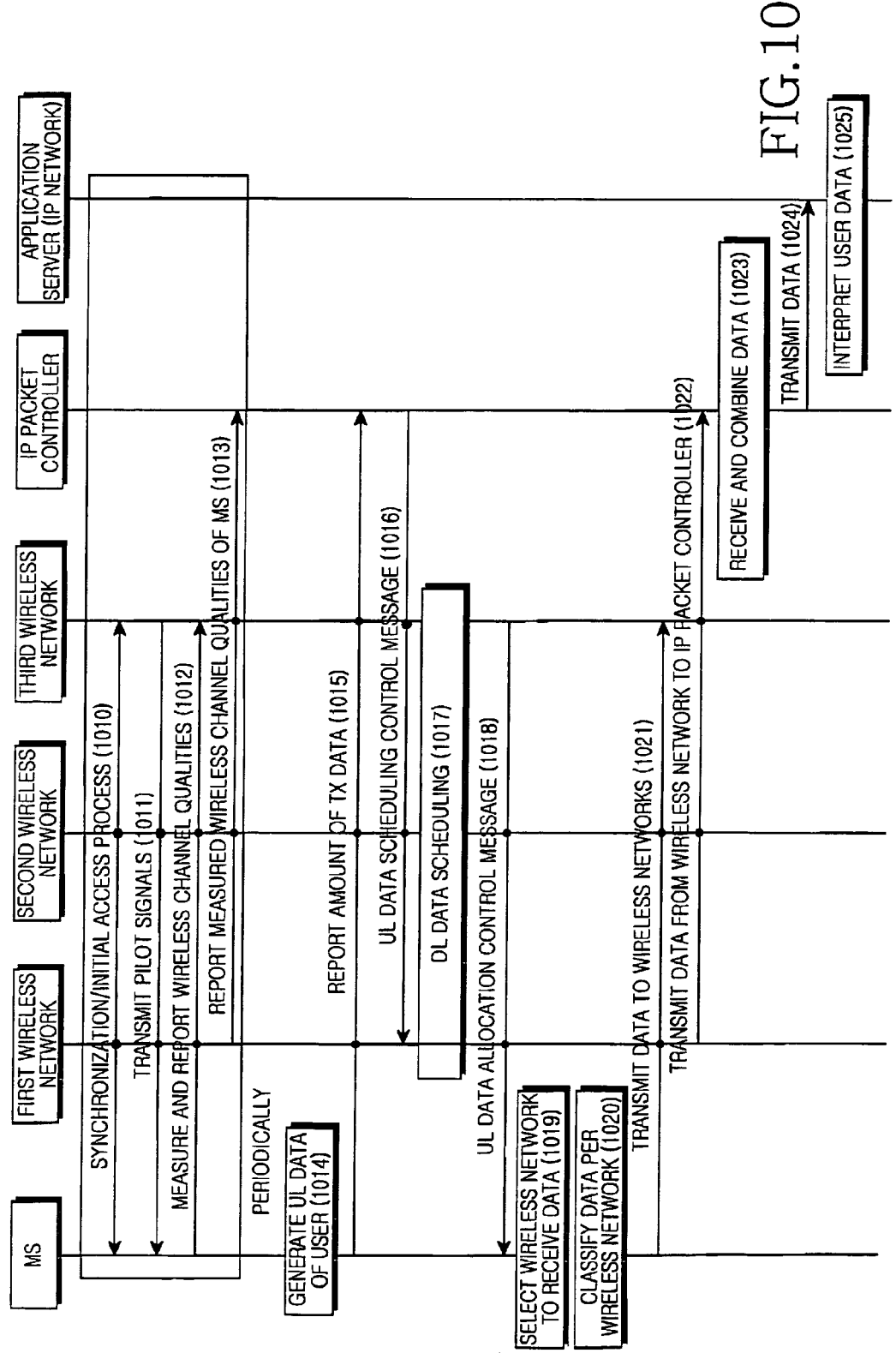
FIG. 10 is a flow diagram illustrating a UL data transmission procedure according to the present invention.

FIG. 10 is a flow diagram illustrating a UL data transmission procedure according to the present invention. For conciseness, wireless networks capable of communicating with an MS will be referred to as "first wireless network", "second wireless network", and "third wireless network".

Steps 1010, 1011, 1012 and 1013 are identical respectively to steps 911, 912, 913 and 914, and thus their descriptions will be omitted for conciseness:

In a communication-possible mode with respect to the wireless networks (the first to the third wireless networks), the MS generates UL data destined for an application server, in step 1014.

There are two methods to transmit the generated UL data.

In a first method, one wireless network capable of ensuring QoS is selected among the accessible wireless networks to transmit data, because high-rate data transmission is mostly unnecessary in the UL direction.

In a second method, when high-rate (or high-quality) data transmission is necessary also in the UL direction, data are transmitted concurrently through the accessible wireless networks.

The following description will be made in terms of the second method. In step 1015, the MS reports the amount of TX DL data to an IP packet controller. At this point, the data amount can be reported through one of the wireless networks or through all of them. In step 1016, the IP packet controller generates and transmits a control message containing the division information of the DL data to the wireless networks. Upon receipt of the control message, the wireless networks perform a scheduling operation on the basis of the received control message in step 1017. In step 1018, the wireless networks transmit UL channel allocation messages to the MS according to the schedule results. The UL channel allocation messages include information of a channel (or resource) allocated for UL transmission of the MS.

Upon receipt of the channel allocation messages from the wireless networks, the MS selects wireless networks to receive UL data and determines the size of data destined for each wireless network in step 1019. In step 1020, the MS divides the generated UL data suitably for transmission to the selected wireless networks. In step 1021, the MS transmits the divided data to the corresponding wireless networks simultaneously.

In step 1022 upon receipt of the data from the MS, the wireless networks transmit the received data to the IP packet controller. In step 1023, the IP packet controller combines packets received from the wireless networks to restore an original IP packet. In step 1024, the IP packet controller transmits the restored IP packet to an application server through an IP network. In step 1025, the application server interprets the IP packet received from the IP packet controller according to predetermined protocol standards.

Because the MS receives data concurrently from a plurality of heterogeneous wireless networks, it can receive a data service seamlessly even in the case of disconnection from one wireless network.

As described above, the present invention makes it possible to a seamless data service to an MS in service environments with a mixture of different wireless communication systems. Also, the present invention can prevent a vertical handoff that can frequently occur between heterogeneous networks. Also, a data rate can be enhanced by simultaneous transmission of different data respectively to several wireless networks, and a data error rate can be reduced by simultaneous transmission of the same data to the wireless networks. Also, the present invention can reduce the signal overhead that can be caused by frequent handoffs.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for distributing packets to at least two heterogeneous wireless networks, comprising:
    an Internet Protocol (IP) layer for processing IP packets received from an IP network;
    an IP sublayer for distributing IP packets received from the IP layer for transmission to at least two heterogeneous wireless networks accessible by a Mobile Station (MS) and transferring each of the distributed IP packets to Medium Access Control (MAC) layers of the at least two heterogeneous wireless networks,
    the MAC layers for communicating with the heterogeneous wireless networks; and
    physical layers corresponding respectively to the MAC layers,
    wherein the IP sublayer comprises:
    a controller for determining at least two heterogeneous wireless networks accessible, based on a possibility of communication between the MS and the at least two heterogeneous wireless networks and channel information;
    a distributor for dividing the IP packet received from the IP layer for transmission to the at least two heterogeneous wireless networks accessible; and
    a header generator for adding a subheader containing a sequence number to each of packets received from the distributor and adding an IP header of the IP packet to the subheader to generate IP subpackets,
    wherein the controller determines the amount of data destined for each of the at least two heterogeneous wireless networks according to wireless channel conditions between the MS and the at least two wireless networks accessible.

2. The apparatus of claim 1, wherein the IP sublayer comprises:
    a header remover for removing an IP header and a subheader from each of IP subpackets received from the MS; and
    a combiner for combining the IP subpackets into an IP packet on the basis of a sequence number recorded in the removed subheader and transmitting the resulting IP packet to the IP layer.

3. The apparatus of claim 1, wherein the IP sublayer comprises:
    a controller for determining the at least two heterogeneous wireless networks that are accessible; and
    a distributor for distributing IP packets received from the IP layer according to service types and transmitting each of the distributed IP packets to a MAC layer of the at least two heterogeneous wireless networks corresponding to each of the service types.

4. A Mobile Station (MS), comprising:
    Medium Access Control (MAC) layers for communicating with at least two heterogeneous wireless networks; and
    an Internet Protocol (IP) sublayer for combining IP subpackets transferred from the MAC layers and received from the at least two heterogeneous wireless networks into an IP packet and transferring the resulting IP packet to an IP layer,
    wherein the IP subpackets transferred from the MAC layers are concurrently received via the at least two heterogeneous wireless networks, and
    wherein the IP sublayer comprises:
    a controller for determining at least two heterogeneous wireless networks accessible, based on a possibility of communication between the MS and the at least two heterogeneous wireless networks and channel information;
    a distributor for dividing the IP packet received from the IP layer for transmission to the at least two heterogeneous wireless networks accessible; and
    a header generator for adding a subheader containing a sequence number to each of packets received from the distributor, adding an IP header of the IP packet to the subheader to generate IP subpackets, and transmitting the IP subpackets to a MAC layer of the at least two heterogeneous wireless networks accessible.

5. The Mobile Station of claim 4, wherein the IP sublayer comprises:
    a header remover for removing an IP header and a subheader from each of the transferred IP subpackets; and
    a combiner for combining the IP subpackets into an IP packet on the basis of a sequence number recorded in the removed subheader and transmitting the resulting IP packet to the IP layer.

6. The Mobile Station of claim 4, wherein the IP sublayer comprises:
    a controller for determining at least two heterogeneous wireless networks that are accessible; and
    a distributor for distributing IP packets received from the IP layer according to service types and transmitting each of the distributed IP packets to a MAC layer of the at least two heterogeneous wireless networks corresponding to each of the service types.

7. A method for providing a data service from an Internet Protocol (IP) packet controller to a Mobile Station (MS), comprising the steps of:
    determining at least two heterogeneous wireless networks accessible by the MS based on a possibility of communication between the MS and the at least two heterogeneous wireless networks and channel information;
    distributing IP packets destined for the MS for transmission to the at least two heterogeneous wireless networks that are accessible; and
    concurrently transmitting each of the distributed IP packets to the at least two heterogeneous wireless networks that are accessible, wherein distributing the IP packets further comprises:
  determining the amount of data to be transmitted to each of the at least two heterogeneous wireless networks; and
  distributing the IP packets destined for the MS on the basis of the determined data amount.

8. The method of claim 7, wherein distributing the IP packets further comprises:
  dividing the IP packet for transmission to the at least two heterogeneous wireless networks that are accessible; and
  adding a subheader containing a sequence number to each of the divided packets and adding an IP header of the IP packet to the subheader to generate IP subpackets.

9. The method of claim 7, wherein distributing the IP packets further comprises:
  determining channel quality between the MS and the at least two heterogeneous wireless networks that are accessible; and
  if the channel quality satisfies a predetermined condition, repeating an IP packet destined for the MS for simultaneously transmission to the at least two heterogeneous wireless networks that are accessible.

10. The method of claim 7, wherein the IP packets destined for the MS are distributed according to service types.

11. A communication method for a Mobile Station (MS), comprising the steps of:
  measuring channel qualities between the MS and at least two heterogeneous wireless networks that are accessible and reporting the measured channel qualities to an upper-layer network device;
  concurrently receiving Internet Protocol (IP) subpackets from the at least two heterogeneous wireless networks that are accessible under the control of the upper-layer network device;
  combining the received IP subpackets into an IP packet and determining corresponding application data;
  reporting the amount of Transmission (TX) data to the upper-layer network device;
  receiving channel allocation messages from the at least two heterogeneous wireless networks accessible under the control of the upper-layer network device;
  distributing the TX data for transmission to the at least two heterogeneous wireless networks accessible, based on a possibility of communication between the MS and the at least two heterogeneous wireless networks and channel information; and
  transmitting each of the distributed TX data to the at least two heterogeneous wireless networks accessible.

12. The communication method of claim 11, further comprising:
  distributing TX packets according to the types of a plurality of services; and
  transmitting each of the distributed TX packets to the at least two heterogeneous wireless networks that are accessible of the corresponding service type.

* * * * *